Sept. 8, 1931.  O. G. SCHMITT  1,822,377
PROCESS FOR MANUFACTURING FLEXIBLE PADS
Original Filed March 20, 1930  5 Sheets-Sheet 1

Sept. 8, 1931. O. G. SCHMITT 1,822,377
PROCESS FOR MANUFACTURING FLEXIBLE PADS
Original Filed March 20, 1930    5 Sheets-Sheet 4

Inventor
Otto G. Schmitt,
By Frank A. Belknap
Atty.

Sept. 8, 1931. O. G. SCHMITT 1,822,377
PROCESS FOR MANUFACTURING FLEXIBLE PADS
Original Filed March 20, 1930 5 Sheets-Sheet 5
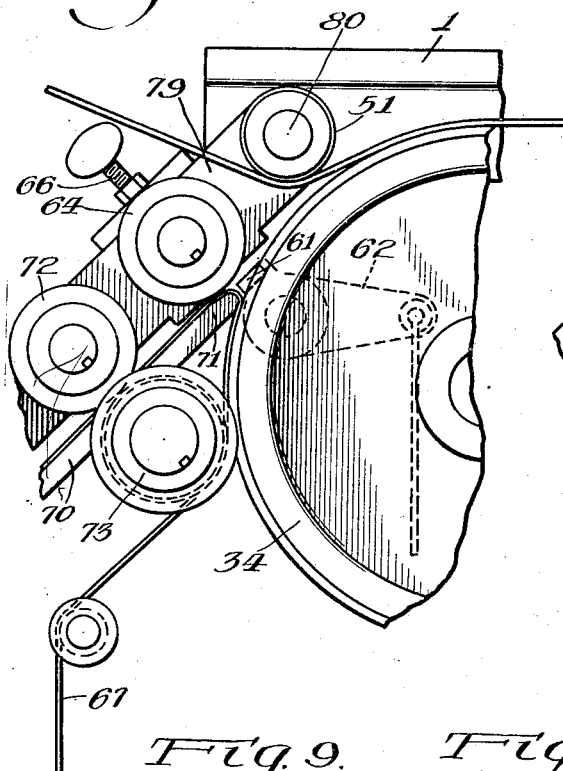
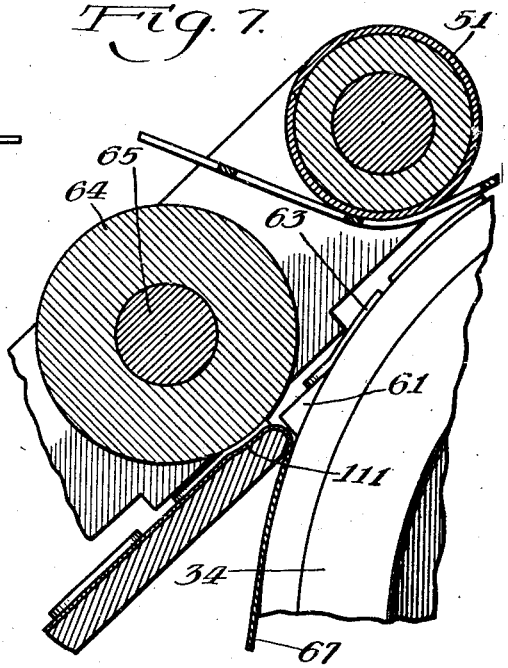
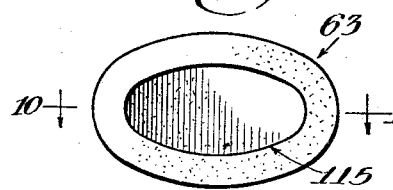
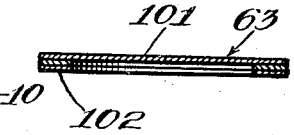
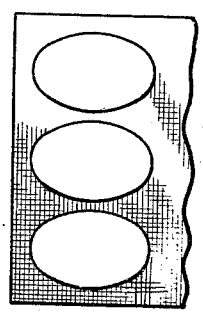
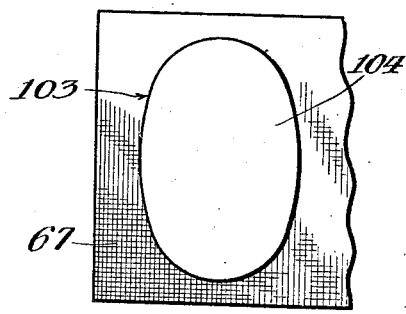
Inventor:
Otto G. Schmitt,
By Frank L. Belknap
Atty.

Patented Sept. 8, 1931

1,822,377

UNITED STATES PATENT OFFICE

OTTO G. SCHMITT, OF OMAHA, NEBRASKA

PROCESS FOR MANUFACTURING FLEXIBLE PADS

Original application filed March 20, 1930, Serial No. 437,503. Divided and this application filed January 7, 1931. Serial No. 507,070.

This application is a division of my application Serial No. 437,503 filed March 20th, 1930.

The present improvement relates more specifically to a machine particularly designed to operate on a continuously advancing strip of raw material to automatically produce pads or plasters to be applied to corns, bunions, and similar ailments of the feet.

The essence of the present invention resides in a machine which is completely automatic in operation, producing the pads or plasters described above as part of a continuous operation, resulting in increased output and high efficiency.

The machine of the present invention, briefly described, comprises means for automatically feeding strips of raw material from which the pads are made, to a rotary die which cuts the centers from said strip, said centers being adhesively united to the surface of a bed roll upon which the same are cut and are subsequently removed from said surface as waste. The perforated strip is thereafter carried forward, whereupon another strip of raw material is then automatically applied to the surface of said forwardly moving strip, and the multi-ply strip having the center holes is fed to a rotary die which operates on the multi-ply strip to mark out or define the outside edges of the pad. The outside waste from around these pads is then automatically removed, and the pads adhesively united to the bed roll upon which they are cut, are carried to a device for automatically stripping them from said bed roll and applying them to the surface of a moving sheet of crinoline or gauze-like material. The crinoline is fed forward to a severing device which is automatically operated to sever said crinoline into individual strips containing a predetermined uniform number of pads adhering to one surface. These individual strips are then ready for packing.

The entire operation from the feeding of the raw material to the collecting of the pads on individual sheets of gauze, is entirely automatic. The machine of the present invention results in a greatly increased quantity of pads being produced in a given length of time, as compared with the semi-automatic machines in use at the present time.

One of the objects of the present invention comprises the provision of means for maintaining the cut-outs, in both cutting stages, adhesively united to the surface of the bed rolls upon which they are cut, and means for removing the cut-outs from said rolls.

Another feature of my invention resides in an improved method and machine whereby the raw material in strip form is automatically fed to the machine.

It is also an object of the invention to provide in a machine of the character described, revolving die cutting wheels to cut out the centers of the pads per se while operating at a very high rate of speed, thus eliminating the noise and vibration normally occurring in a reciprocating punch press.

Another object of the present invention is to provide, in a machine of the character described, mechanism for removing the outside waste comprising the material between the pads after the second revolving die has operated on the forwardly moving strip.

It is a still further object of the present invention to provide, in a machine of the character described, mechanism for stripping the pads from the bed roll on which they are travelling and automatically applying them to suitable gauze or crinoline, and simultaneously providing mechanism whereby the gauze or crinoline to which the pads have been applied is cut into convenient lengths to be packed.

Many other important objects and advantages of the present invention will be more clearly apparent from the following description:

Fig. 6 is a detail elevational view of the mechanism for applying the pads to the crinoline.

Fig. 7 is an enlarged detail view of a portion of the mechanism shown in Fig. 6.

Fig. 8 is a top plan view illustrating particularly the secondary stripping knife.

Fig. 9 is a bottom view of one of the products of the present machine.

Fig. 10 is a sectional view taken along line 10—10 of Fig. 9.

Fig. 11 is a fragmentary top plan view of a plurality of corn pads applied to a crinoline base.

Fig. 12 is a fragmentary top plan view of a single bunion pad applied to the same width crinoline.

Figure 1:
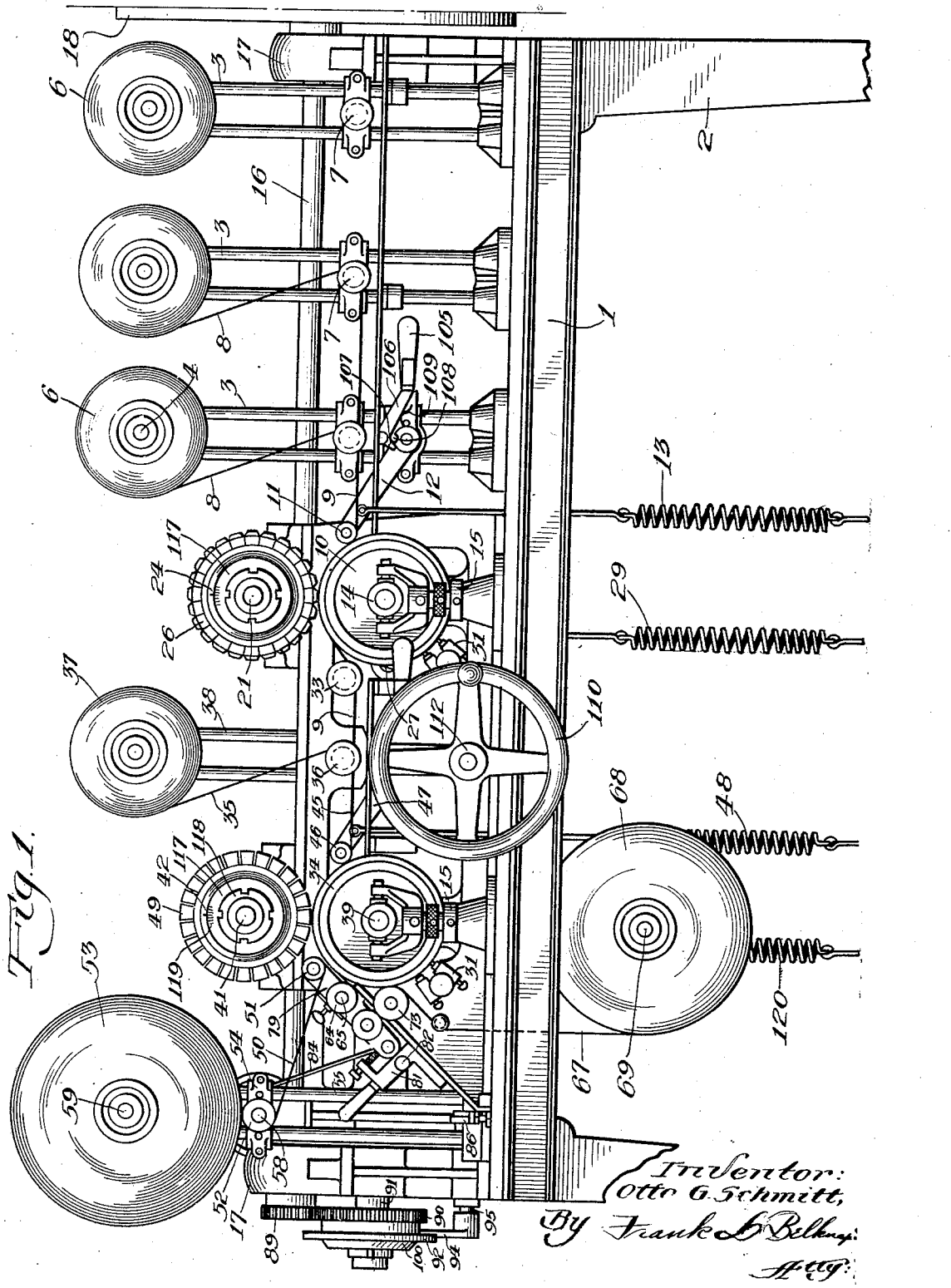
Fig. 1 is a side elevational view.

Referring in detail to the drawings, 1 indicates a frame or the like supported by a plurality of legs 2. Mounted upon one end of the frame 1 is a plurality of upstanding supports 3, at the top of each of which may be disposed a spindle 4, said spindle being adjustably positioned upon the supports 3 by means of clamps 5. A spool or roll of adhesive material such as the usual adhesive tape 6 may be positioned upon each of the spindles 4 and may be adapted to rotate thereon. Disposed intermediate the length of each of the supports 3 is an adjustable guide roll 7. In the production of the usual corn pad hereinbefore described, two strips of adhesive material 8 from two of the rolls may be fed forwardly to the machine proper, whereupon it is acted upon to produce a portion of the corn pad, as will be hereinafter more fully described. If a bunion pad is to be constructed by the machine, an additional strip of adhesive material may be fed in conjunction with the remaining two strips.

The strips 8 taken together and forming the composite strip 9 may be fed forwardly to a bed roll 10 and may be adhesively united to the periphery thereof by means of draw roll 11 mounted upon one end of shaft 12. In order to maintain a suitable pressure upon the roll 11 to properly unite the composite strip 9 to the surface of the roll 10, a tension spring 13 may be operatively connected to one end of the lever 12. It is to be understood, of course, that the tension of the spring 13 may be maintained at a suitable value by means not shown but which will be readily apparent to those skilled in the art. The roll 10 may be mounted upon bearings 14 which may be vertically adjustable by means of micrometer mechanism 15.

A shaft 16 may traverse substantially the entire length of the frame 1 and may be journaled in conventional bearings 17. A pulley wheel 18 may be mounted upon shaft 16 and is adapted to be driven by a suitable prime mover (not shown). A worm-gear 19 may be mounted upon shaft 16 and may be adapted to mesh with worm-wheel 20 mounted upon transverse shaft 21 journaled in conventional bearings 22. A spur-gear 23 may also be mounted upon shaft 21 and is adapted to mesh with another spur-gear (not shown), which secondary spur-gear may drive bed roll 10. A rotary die 24 may be positioned upon the outer end of shaft 21 and may be disposed immediately above bed roll 10. In this manner, by means of the aforesaid meshing spur-gears, the bed roll 10 and rotary die 24 may rotate in synchronism. The bed roll 10 may, by suitable manipulation of the micrometer mechanism 15, be brought to desired proximity with the periphery of the rotary die 24. Preferably, the adjustment is so made that a slight contact is maintained between the peripheries of the two co-acting wheels.

Figure 4:
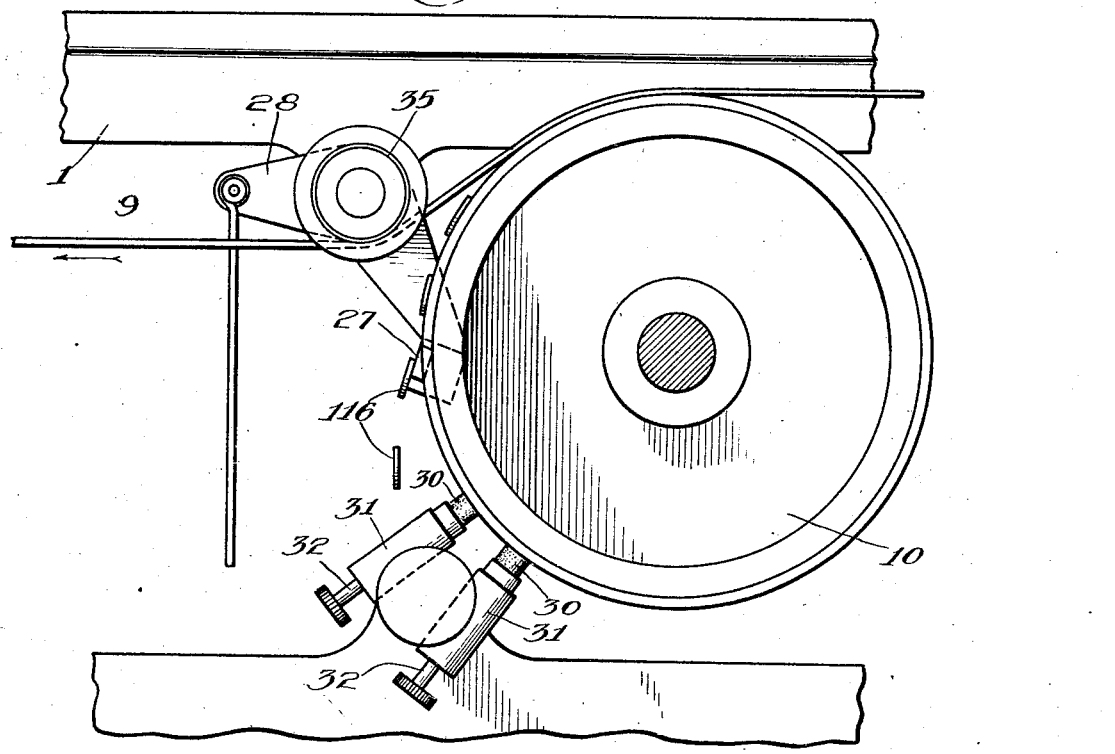
Fig. 4 is a detail elevational view of the pad-stripping mechanism.
Figure 5:
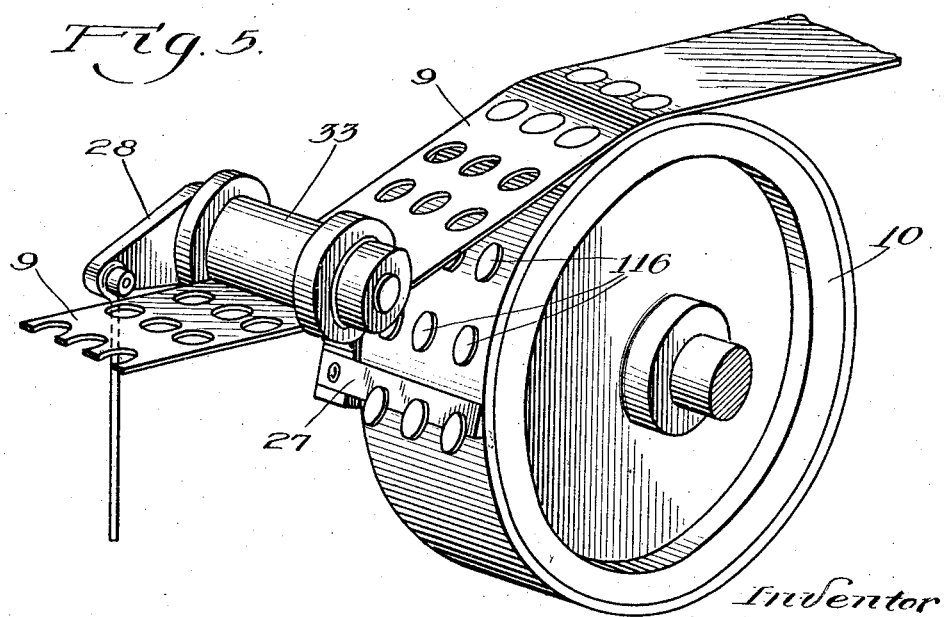
Fig. 5 is a detail perspective of the device as shown in Fig. 4.

Referring particularly to Figs. 4 and 5, the composite strip 9 upon passing between the bed roll 10 and rotary die 24 may be perforated and the waste pads may be separated from the perforated strip by carrying said perforated strip forward and out of contact with the surface of the bed roll 10, the pads punched from said strip remaining adhesively united to the surface of said roll. A stripping knife 27 may be operatively positioned adjacent the surface of the roll 10 and may be adapted to pry and remove the adhesively united pads from the surface of said roll. The knife 27 may be mounted on one end of a bell-crank lever 28, which in turn may be pivotally mounted upon a portion of frame 1, and pressure may be applied to the opposite end of lever 28 by means of spring 29.

To assist the removal of the perforated strip 9 from the surface of the roll 10 and also the removal of the waste pads from the surface of said roll, a coating substance 30 may be applied to the surface of said roll at one portion of its revolution. The substance 30 may ordinarily take the form of wax or some such similar material, and may be contained in a suitable housing 31 mounted upon frame 1. By means of screw 32 having upon its end a conventional plunger (not shown), the contact of the material 30 with the surface of roll 10 may be made adjustable. The strip 9 upon leaving the surface of roll 10 may pass under guide roll 33 mounted upon frame 1, and may be carried forward to a secondary bed roll 34. Intermediate its travel, a secondary strip of adhesive material 35, similar to the strips 8, may be joined to the upper surface of the composite strip 9 at guide roll 36. The strip 35 may be fed from a roll 37 mounted upon upstanding supports 38.

The secondary bed roll 34 may be mounted, similar to the roll 10, upon adjustable bearings 39 and may be driven by a spur-gear (not shown), which in turn meshes with spur-gear 40 mounted upon shaft 41. A secondary rotary die 42 may also be mounted upon shaft 41 and may be disposed immediately above roll 34. A worm-gear 43 may be mounted upon shaft 16 and is adapted to mesh with worm-wheel 44 mounted upon shaft 41. In this manner the roll 34 and rotary die 42 may be driven in synchronism with each other and may also be timed with the primary bed roll 10 and its co-operating rotary die 24.

The strip 35 and the perforated strip 9 may be adhesively united at the roll 36, forming a composite strip 45 comprising one unperforated ply and two perforated plies. The strip 45 is then carried forward beneath roll 46 mounted upon lever 47 similar to lever 12, and is thereby adhesively applied to the surface of bed roll 34, tension being supplied to lever 47 by means of spring 48. The strip 45 traveling with the surface of the wheel 34 passes under the secondary die 42 which is so timed that the individual dies 49 comprising the rotary member 42 perforates said strip and defines the outer periphery of the finished corn pad.

Figure 2:
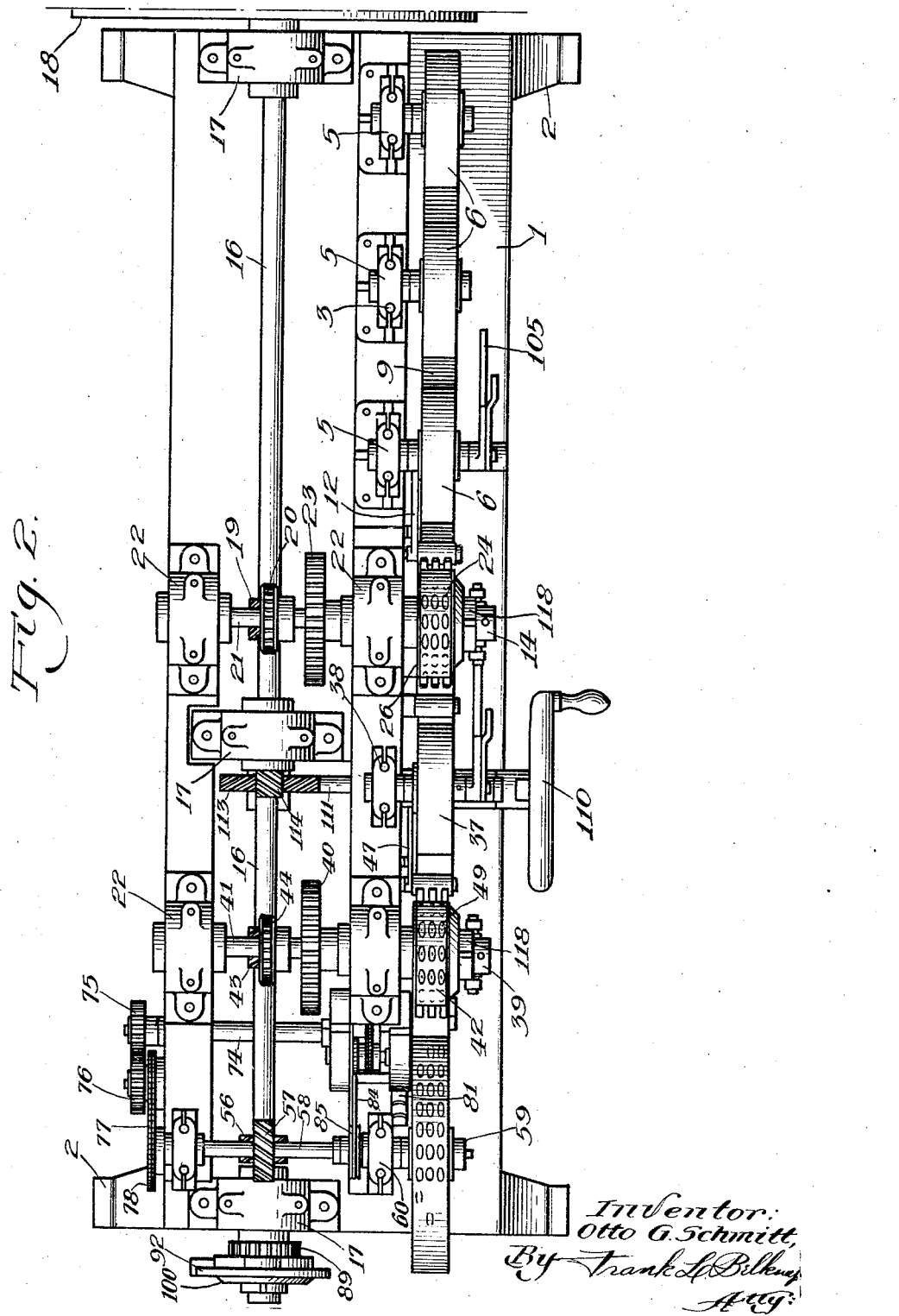
Fig. 2 is a top plan view.

The skeleton strip 50 resulting from this perforating action may be carried under roll 51, around driven roll 52, and may be wound upon roll 53. The roll 52 may be journaled upon clamp member 54, which in turn may be mounted upon supports 55. As shown best in Fig. 2, a worm-gear 56 mounted upon shaft 16 may mesh with worm-wheel 57 which may be mounted upon transverse shaft 58. The roll 52 may be mounted upon one end of said shaft and may draw the skeleton strip 50 out of contact with the surface of roll 34 and simultaneously, by means of friction contact, drive the roll 53. The roll 53 may be built up upon shaft 59, which in turn may be disposed upon member 60 which is adapted to slide vertically upon supports 55.

A stripper 61 comprising a portion of swingable levers 62 and presenting a knife edge may be interposed between the lower surface of pads 63, which remain adhesively united to the surface of roll 34, and the upper surface of roll 34, thus serving to strip said pads from the surface of said roll. Disposed immediately adjacent the stripping element 61 and mounted above the pads is a pressure roll 64 mounted on a shaft 65, said shaft being adjustable toward and away from the roll 34 by means of adjusting mechanism 66. The pressure roll 64 comes in contact with the upper surface of pad 63 substantially simultaneously with the stripping, serving to carry the pad forward and facilitating stripping action. At the same time a strip of crinoline or gauze 67 fed from a spool 68 mounted on shaft 69, is fed upwardly from the spool and thence in the direction of travel of the pads 63. This strip of crinoline is brought into contact with the under surface of the pads immediately subsequent to the stripping action, the pressure roll 64 serving to impose the necessary pressure to cause adhesion between the pads 63 and the strip of crinoline 67. A support 70 having a curved forwardly-projecting portion 71 is provided for the purpose of supporting the moving gauze 67 and directing said gauze into contact with the pad at the proper point. The material 67 may be fed forwardly by means of a roller 72 which may be provided with knurled edges. The roller 72 may cooperate with a bed roll 73, the outside width of which is greater than the width of roll 72.

The pads 63 upon the surface of roll 34 are positioned relatively close together in a forwardly moving direction. It has been found preferable in uniting said pads to the surface of the crinoline 67 to increase the space between adjacent pads. To accomplish this, the speed of the crinoline passing around the curved edge 71 may be made greater than the peripheral speed of the roll 34. The rolls 72 and 64 may be operatively connected by means of a sprocket chain (not shown), and both may be driven in timed relation with each other by means of shaft 74 which has mounted on one end thereof spur-gear 75 adapted to mesh with spur-gear 76 journalled upon frame 1. Gear 76 may be driven by sprocket chain 77 which passes over a sprocket wheel 78 mounted on one end of shaft 58. To provide varying distances between adjacent pads on the surface of the crinoline strip, the gears 75 and 76 may be changeable so that various speeds may be imparted to the crinoline strip as desired.

The rolls 64 and 72 may be journalled upon carriage 79 which may be pivotally mounted at 80 upon frame 1. The arrangement is such that upon rotation of adjustable clamp 81 about the pivot point 82 a counter weight 83 attached to cord 84 passing over pulley 85 will raise the lower end of said carriage out of contact with the member 70. In this manner the threading of the gauze through the rolling mechanism may be facilitated.

The crinoline 67 with pads 63 adhesively united thereto is now ready to be cut into short strips of such lengths so as to have a predetermined number of pads on each strip ready for packing and sale. This cutting is done by shear 86 mounted upon arm 87, said shear adapted to cooperate with a corresponding shear 88. A gear 89 may be disposed upon the end of shaft 16 and may mesh with gear 90 mounted upon shaft 91. A cam 92 may also be mounted upon shaft 91 and is provided with an indentation 93 at one portion of its peripheral edge. A lever 94 may be mounted upon pin 95, which in turn may be rigidly connected to arm 87. The lever 94 may be provided with an element 96 which contains a lug 97 adapted to register with the notch 93. A spring 98 may be operatively connected to an intermediate portion of arm 87 and is adapted to normally maintain the edge of lug 97 in contact with the peripheral edge of the cam wheel 92. In this manner upon rotation of the wheel 92, whenever the notch 93 and lug 97 come into registration by means of spring 98, the arm 97 will be pulled downwardly, thereby shearing the strip of crinoline 67 and the pads 63 adhesively united thereto. In this manner unit strips of crinoline with a predetermined number of pads disposed thereon may be formed ready for packing, shipment and sale.

To vary the position of the cut edge of the crinoline strip with respect to the pads mounted thereon, the wheel 92 may be constructed to be adjustable upon the shaft 91, that is, the same may be rotated either to the right or left to change the cyclic relation of the cutting action. This adjustment may be made by releasing lock nut 99, which in turn releases friction plate 100, thereby permitting free rotary movement of the wheel 92 upon shaft 91. If desired, the length of the resultant unit crinoline strip may be changed or varied by changing the gear ratios of the gears 89 and 90.

In operation, if it is desired to produce a pad as shown best at 63, in Figs. 9 and 10, comprising an unperforated face sheet 101 and a plurality of perforated sheets 102, strips 8 may be carried from a pair of rolls 6 and may be carried over rollers 7, the ends of the strips 8 being joined together and carried forwardly in the form of a composite or laminated strip 9. If a bunion plaster 103 is to be constructed, the same may comprise a face strip 104, corresponding to the strip 101 of the corn plaster, and instead of having a two-ply perforated strip similar to the member 102, an additional perforated strip (not shown) may be added. This additional strip may be drawn from the third roll 6 and carried over its respective roller and joined adhesively to the two additional strips 8 forming a composite strip having three instead of two plies. Callous pads may be constructed in the same manner as the bunion pads, and differ only in shape, the bunion pads being more or less oval shaped, whereas the callous pads have a circular contour.

The end of the strip 9, whether of two or three ply, may be adhesively applied to the surface of bed roll 10. In carrying out this initial threading operation, the lever 12 may be raised against the action of spring 13 by depressing a handle 105. A latch 106 may be pivotally mounted upon lever 105 and may be provided with a downwardly extending lug 107, which upon rotation of lever 12 is adapted to be forced into notch 108 by the action of spring 109. In this manner the lever 12, and hence the roller 11, will be held in an upraised position away from the surface of bedroll 10. After having the end of the composite strip 9 securely applied to the surface of bed roll 10, lever 12 may be released from its upraised position and allowed to contact the composite strip 9 and maintain the same firmly against the surface of roll 10.

A hand wheel 110 may be mounted upon one end of shaft 111 and may be operatively connected to said shaft by means of a conventional lock nut 112. The shaft 111 may be suitably journaled in frame 1 and may be provided at one end with a helical pinion (not shown), which is adapted to mesh with a cooperating helical idler gear 113, said gear in turn meshing with a driving pinion 114 mounted upon shaft 16. By this arrangement the shaft 16 may be set in motion manually, and after the device has been suitably threaded said manual means may be disengaged by simply releasing the lock nut 112.

Upon rotation of the bed roll 10 the strip 9 adhesively applied to the surface thereof may be carried under the rotary die 24 and a plurality of apertures 115 may be produced in said sheet. The perforated strip may be then carried forward and removed from the surface of the roll 10, and cut-outs 116 resulting from the perforating action of the dies 26 will be carried upon the surface of roll 10 and may be removed by spring actuated stripping knife 27, as shown best in Fig. 5.

An unperforated single ply adhesive strip 35 may be joined to the end of the multi-ply perforated strip 9 upon its passage from roll 10 to roll 34, thus forming a composite strip 45 comprising a single unperforated strip adhesively united to a multi-ply perforated strip. The multi-layer strip 45 may then be applied to the surface of roll 34 in the same manner as has been described in the application of the strip 9 to the roll 10, the lever 47 and roller 46 functioning in the same capacity as the lever 12 and roller 11.

Upon further manual rotation of the wheel 110, the strip 45 carried upon the surface of roll 34 passes beneath secondary rotary die 42, whereupon an incision is made in the strip 45, defining an outline of the completed corn or bunion plaster, which outline may be concentric with the contour of aperture 115. It may be found when initially threading the present device that the incisions cut by the dies 49 may not occupy this concentric position. In this case either or both of the rotary dies 24 or 42 may be rotated through a desired angle independently of the movement of the respective cooperating bed rolls. To accomplish this independent movement of the rotary dies upon the shafts 21 and 41 respectively, each die may be provided with a friction plate 117, which normally may be held in intimate contact with the dies 24 and 42 by means of conventional lock nuts 118. Therefore to rotate either of the dies 24 or 42 independently of the bed rolls 10 or 34, and hence independently of shafts 21 or 41 respectively, the lock nuts 118 may be loosened and the die wheels proper may be rotated the desired amount as indicated by calibrations 119 provided upon friction plates 117.

Figure 3:
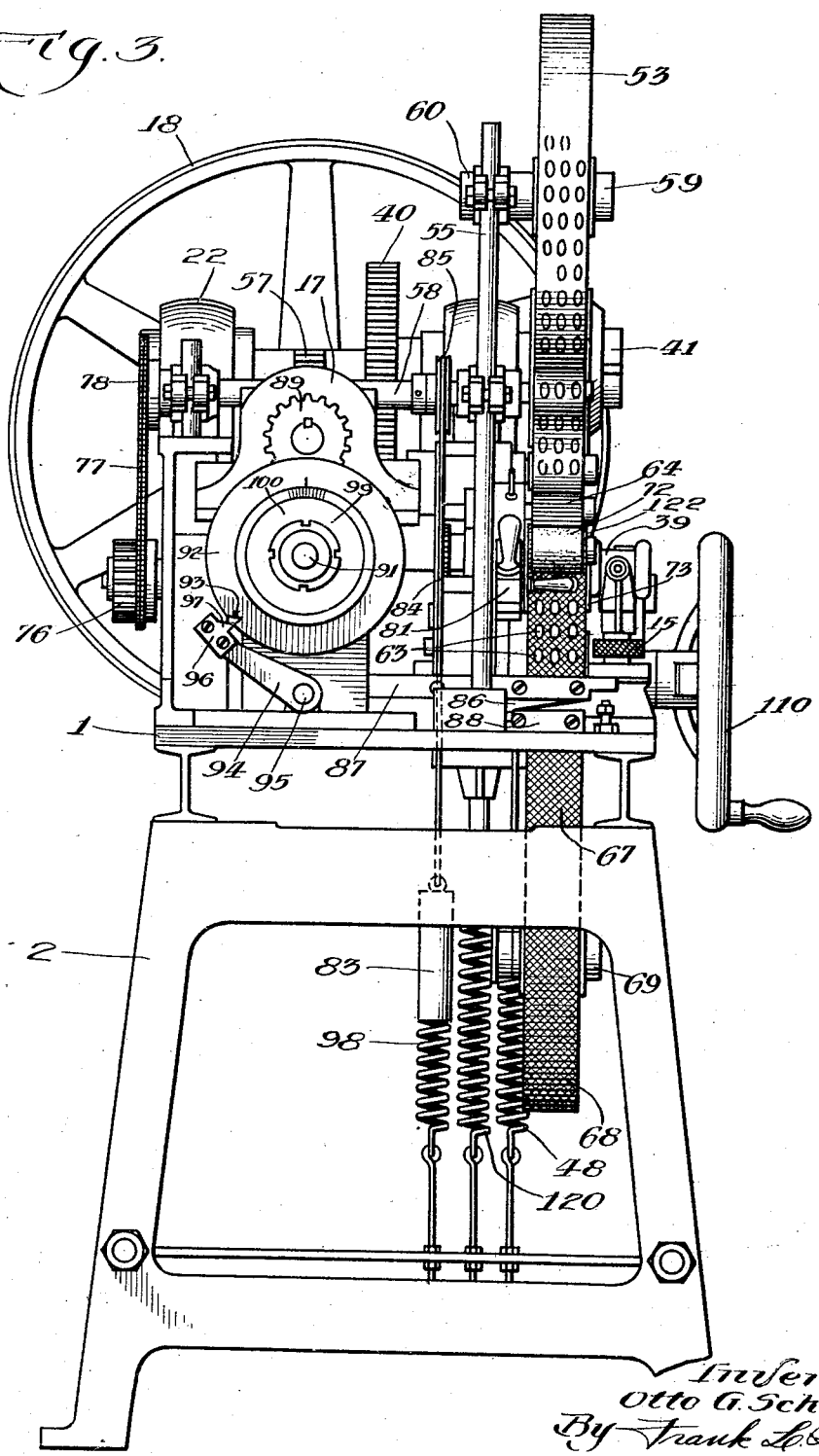
Fig. 3 is an end elevational view of the machine of the present invention.

The skeleton waste strip 50 resulting from the perforating action of the dies 49 may then be removed from the surface of the roll 34 and may be carried around roll 52 and applied to a waste spool 53. It can readily be seen that as waste material is continually being wound upon the spool 53, the diameter of said waste roll will continually increase. Hence the shaft 59 upon which the waste material 53 is mounted may be slidably positioned upon the standards or supports 55 as shown best at 60 in Fig. 3.

The cut-outs or pads 63 resulting from the perforating action of the dies 49 are carried forwardly upon the surface of roll 34 and may be stripped therefrom by stripper 61, which may be maintained in intimate contact with the surface of said roll by means of the tension of spring 120 acting upon lever 62. Simultaneously with the stripping of the pad 63 from the roll 34, a sheet of crinoline or gauze-like material 67 may be fed upwardly from roll 68 and guided around the lower surface of roll 73, around the extension 71 and under pressure roll 64. At this point the forwardly traveling pad 63 is adhesively applied to the surface of the crinoline 67, as shown best at 121 Fig. 7. To increase the spacing of the pad 63 upon the crinoline strip 67, the strip 67 may be carried forwardly at a relatively greater speed than the peripheral speed of the roll 34. This difference in speed may be varied at will by means of changeable gears 75 and 76 hereinbefore described. The crinoline strip 67 and the surmounted pads 63 may then be carried forwardly along the inclined member 70 and may pass between rolls 72 and 73 whereupon the pad 63 may be firmly pressed in contact with said crinoline strip 67. To facilitate the application of the pads 63 to the strip 67, the roll 64 may be adjustable towards or away from the surface of roll 34, and in addition the rolling surface of roll 34 may be knurled to increase frictional contact upon the upper surface of pads 63. The crinoline strip 67 may be drawn forwardly along the surface of the element 70 by the roll 72, which may be provided with knurled edges as shown best at 122 in Fig. 3.

Upon passing downwardly along the surface of element 70, the continuous crinoline strip in company with the applied pad 63 passes through the shears 86 and 88, wherein said continuous strip may be cut into unit strips containing a predetermined number of adhesively applied pads 63. These unit strips are now in condition for packaging, shipping and marketing.

When cutting bunion or callous plasters or pads, the primary and secondary rotary dies 24 and 42 respectively, may be replaced by similar dies of suitable proportions. These changes are obvious to anyone skilled in the art and need no further elaboration. As shown best in Fig. 12, it can be readily observed that the dimensions of the bunion plaster 103 are such that a fewer number of said pads may be applied to the same sized sheet of crinoline material than the number of corn pads 63. This condition may necessitate a slight change in the cutting instrumentalities, and can be readily accomplished by suitably manipulating the friction plate 100.

I claim as my invention:

1. A process which comprises uniting a continuously advancing strip of adhesive tape to a rotating surface, acting upon said tape to produce apertures therein, removing the apertured tape from said rotating surface, uniting a second strip of adhesive tape with said apertured strip, uniting said united strip with a rotating surface and acting upon said strip to produce incisions enclosing said first mentioned apertures, and separating the cut-outs thus formed by removing the strip from said rotating surface.

2. A process which comprises uniting a continuously advancing strip of adhesive tape to a rotating surface, acting upon said tape to produce spaced apart apertures therein, removing the apertured tape from said rotating surface at a tangent to said surface, uniting a second strip of adhesive tape to said apertured strip, uniting said united strip with a rotating surface and acting upon said strip to produce incisions enclosing said first mentioned apertures, separating the cut-outs thus formed by removing the strip from said rotating surface, and stripping the cut-outs from said second rotating surface and applying them to a suitable foundation material.

3. A process which comprises uniting a continuously advancing multi-ply strip of adhesive tape to a rotating surface, acting upon said tape to produce uniformly spaced apart apertures therein of uniform size and shape, removing the apertured tape from said rotating surface at a tangent to said surface, uniting a second strip of adhesive tape to said apertured strip, uniting said united strip with a rotating surface and acting upon said strip to produce incisions enclosing said first mentioned apertures, separating the cut-outs thus formed by removing the strip from said rotating surface, and stripping the cut-outs from said second rotating surface and applying them to a suitable foundation material.

4. A process which comprises uniting a continuously advancing strip of adhesive tape to a rotating surface, acting upon said tape to produce spaced apart apertures therein, removing the apertured tape from said rotating surface at a tangent to said surface, uniting a second strip of adhesive tape to said apertured strip, uniting said united strip with a rotating surface and acting upon said strip to produce incisions enclosing said first mentioned apertures, separating the cut-outs thus formed by removing the strip from said rotating surface and stripping the cut-outs from said second rotating surface and applying same to a strip of gauze-like material, and intermittently severing said strip of gauze-like material into individual strips each containing a predetermined uniform number of said cut-outs adherently united thereto.

5. A process which comprises uniting a continuously advancing strip of adhesive tape to a rotating surface, acting upon said tape to produce spaced apart apertures therein, removing the apertured tape from said rotating surface at a tangent to said surface, uniting a second strip of adhesive tape to said apertured strip, uniting said united strip with a rotating surface and acting upon said strip to produce incisions enclosing said first mentioned apertures, separating the cut-outs thus formed by removing the strip from said rotating surface, and stripping the cut-outs from said second rotating surface and substantially simultaneously transferring same to a moving strip of gauze-like material in such a manner that the cut-outs are adherently united to said strip of gauze-like material in uniform spaced apart relation.

6. A process which comprises uniting a continuously advancing strip of adhesive tape to a rotating surface, acting upon said tape to produce spaced apart apertures therein, removing the apertured tape from said rotating surface at a tangent to said surface, uniting a second strip of adhesive tape to said apertured strip, uniting said united strip with a rotating surface and acting upon said strip to produce incisions enclosing said first mentioned apertures, separating the cut-outs thus formed by removing the strip from said rotating surface, and stripping the cut-outs from said second rotating surface and substantially simultaneously transferring same to a moving strip of gauze-like material in such a manner that the cut-outs are adherently united to said strip of gauze-like material intermediate said cut-outs to produce individual strips of gauze-like material each containing a predetermined number of adherently united cut-outs.

In testimony whereof I affix my signature.

OTTO G. SCHMITT.